(12) United States Patent
Fenton et al.

(10) Patent No.: US 8,198,752 B2
(45) Date of Patent: Jun. 12, 2012

(54) ELECTRICAL COUPLING APPARATUS AND METHOD

(75) Inventors: Stephen Paul Fenton, Aberdeenshire (GB); Adnan Kutubuddin Bohori, Bangalore (IN)

(73) Assignee: General Electric Company, Niskayuna, NY (US)

( * ) Notice: Subject to any disclaimer, the term of this patent is extended or adjusted under 35 U.S.C. 154(b) by 220 days.

(21) Appl. No.: 12/778,475

(22) Filed: May 12, 2010

(65) Prior Publication Data

US 2011/0278018 A1  Nov. 17, 2011

(51) Int. Cl.
*H02J 3/14* (2006.01)

(52) U.S. Cl. ............................................. 307/64; 307/31

(58) Field of Classification Search ................... 307/31, 307/64
See application file for complete search history.

(56) References Cited

U.S. PATENT DOCUMENTS

| | | | |
|---|---|---|---|
| 3,714,384 A | 1/1973 | Burkhardt et al. | |
| 4,030,058 A | 6/1977 | Riffe et al. | |
| 4,586,767 A | 5/1986 | Benjamin et al. | |
| 4,728,296 A * | 3/1988 | Stamm | 439/275 |
| 4,788,448 A | 11/1988 | Crowe | |
| 4,852,648 A | 8/1989 | Akkerman et al. | |
| 5,007,697 A | 4/1991 | Chadha | |
| 5,008,664 A | 4/1991 | More et al. | |
| 5,052,941 A | 10/1991 | Hernandez-Marti et al. | |
| 5,301,096 A | 4/1994 | Klontz et al. | |
| 6,960,968 B2 | 11/2005 | Odendaal et al. | |
| 7,083,452 B2 | 8/2006 | Eriksson et al. | |
| 7,186,033 B2 | 3/2007 | Deans | |
| 7,323,964 B1 | 1/2008 | Shyu et al. | |
| 7,355,122 B2 | 4/2008 | Moore | |
| 7,576,447 B2 | 8/2009 | Biester et al. | |
| 7,690,936 B1 | 4/2010 | Snekkevik et al. | |
| 2008/0093922 A1 | 4/2008 | Layton | |
| 2008/0265684 A1 | 10/2008 | Farkas | |
| 2010/0097890 A1 * | 4/2010 | Sullivan et al. | 367/82 |

FOREIGN PATENT DOCUMENTS

| | | |
|---|---|---|
| EP | 433752 A1 | 6/1991 |
| GB | 2137677 A | 10/1984 |
| JP | 2009106136 A | 5/2009 |
| WO | 0165069 A1 | 9/2001 |

(Continued)

OTHER PUBLICATIONS

G. Somaschini, SPE, J. Lovell, SPE, H. Abdullah, SPE, B. Chariyev, P. Singh, and F. Arachman, SPE, Schlumberger, ; Abstract : Subsea Deployment of Instrumented Sand Screens in High-Rate Gas Wells; Copyright 2009, Society of Petroleum Engineers; USA, Oct. 4-7, 2009.;1 Page; http://www.spe.org/atce/2009/pages/schedule/documents/spe1250471.pdf.

(Continued)

*Primary Examiner* — Danny Nguyen

(74) *Attorney, Agent, or Firm* — Ann M. Agosti

(57) ABSTRACT

An apparatus to provide electrical coupling between two components in a well system is proposed. The apparatus includes a first component disposed around a well-bore and configured to host electrical connections. A second component is disposed concentrically around the first component and configured for power coupling with the first component. A first power coupling unit is disposed on the first component and configured to host one or more transceivers and resonators. A second power coupling unit is disposed on the second component and configured to host one or more transceivers and resonators. The transceivers and resonators on the first and second power coupling units are configured to transfer power in a contactless manner.

13 Claims, 4 Drawing Sheets

FOREIGN PATENT DOCUMENTS

| WO | 2007008646 A2 | 1/2007 |
|---|---|---|
| WO | 2007093793 A1 | 8/2007 |

OTHER PUBLICATIONS

John Lovell and Stuart Mackay, SPE, Schlumberger.; Permanent reservoir Monitoring in Subsea Wells Attains new Level.; JPT Mar. 2009; pp. 30-33; http://www.slb.com/media/services/resources/articles/completions/200903_jpt_flux.pdf.

Adnan Bohori et al.; Title : Contactless Power Transfer System; Filed on Apr. 28, 2011; U.S. Appl. No. 12/845,133; 24 Pages.

Adnan Bohori et al.; Title : Contactless Power Transfer System; U.S. Appl. No. 12/845,133, filed Jul. 28, 2010; 34 Pages.

Adnan Bohori et al.; Title : Power Transfer System and Method; U.S. Appl. No. 12/822,232, filed Jun. 24, 2010; 19 Pages.

Adnan Bohori et al.; Title : System and Method for Contactless Power Transfer in Portable Image Detectors; U.S. Appl. No. 13/149,170, filed Jun. 24, 2010; 19 Pages.

Adnan Bohori et al.; Title : Contactless Power Transfer System; U.S. Appl. No. 12/820,208, filed Jun. 22, 2010; 18 Pages.

Adnan Bohori et al.; Title : Systems for Contactless Power Transfer; U.S. Appl. No. 12/914,512, filed Oct. 28, 2010; 17 Pages.

Adnan Bohori et al.; Title : Contactless Power Transfer System and Method; U.S. Appl. No. 12/731,497, filed Mar. 25, 2010; 27 Pages.

Adnan Bohori et al.; Title : System and Method for Contactless Power Transfer in Implantable Devices; U.S. Appl. No. 13/052,196, filed Mar. 21, 2011; 21 Pages.

Aristeidis Karalis, J.D. Joannopoulos, Marin Soljac; Title : Efficient wireless non-radiative mid-range energy transfer; Annals of Physics 323 (2008) 34-48.

Shahrzad Jalali Mazlouman, Alireza Mahanfar, Bozena Kaminska; Title : Mid-range Wireless Energy Transfer Using Inductive Resonance for Wireless Sensors; 6 Pages, 2009.

GB1107635.3 Search Report Jul. 10, 2011.

* cited by examiner

ELECTRICAL COUPLING APPARATUS AND METHOD

BACKGROUND

The invention relates generally to coupling systems and, in particular, to electrical coupling systems for subsea applications.

In subsea or other underwater well drilling procedures, such as those used in the oil and gas industry, concentric wellhead elements are used and typically include a tree head housing and a tubing hanger to support electrical connections within an annular space between a well bore and the tree head. Traditional installation approaches include precisely aligning connections from the tubing hanger to the tree head. Alignment is difficult to achieve in sub-sea environments, particularly in deeper waters and in situations wherein the wellbore is deviated from a vertical position to maximize reservoir penetration into a hydrocarbon bearing structure. Conventional installation approaches additionally involve the use of divers or remotely operated vehicles to effect the physical connection necessary for mechanical connections of electrical contacts between the tubing hanger and the tree and wellheads.

Although wet mate connections between well heads are typically performed under sub-sea conditions, there is a need for solutions that embody electrical couplers for contactless power transfer that will not require precise alignment, will withstand higher operating pressures, and will not require a remote operated vehicle or diver for coupling.

BRIEF DESCRIPTION

Briefly, an apparatus to provide electrical coupling between two components in a well system is proposed. The apparatus includes a first component disposed around a wellbore and configured to host electrical connections. A second component is disposed concentrically around the first component and configured for power coupling with the first component. A first power coupling unit is disposed on the first component and configured to host one or more transceivers and resonators. A second power coupling unit disposed on the second component and configured to host one or more transceivers and resonators. The transceivers and resonators on the first and second power coupling units are configured to transfer power in a contactless manner.

In another embodiment, a method for providing electrical coupling is provided. The method includes installing at least two components within a wellhead system, each component comprising a power coupling unit including a transceiver situated within a pressure isolation element. The method further include positioning a first component concentrically within a second component and aligning the power coupling unit of the first component with the power coupling unit of the second component to enable electrical power and signal communications automatically in both directions in a contactless manner between the transceivers of the power coupling units of the first and second components.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
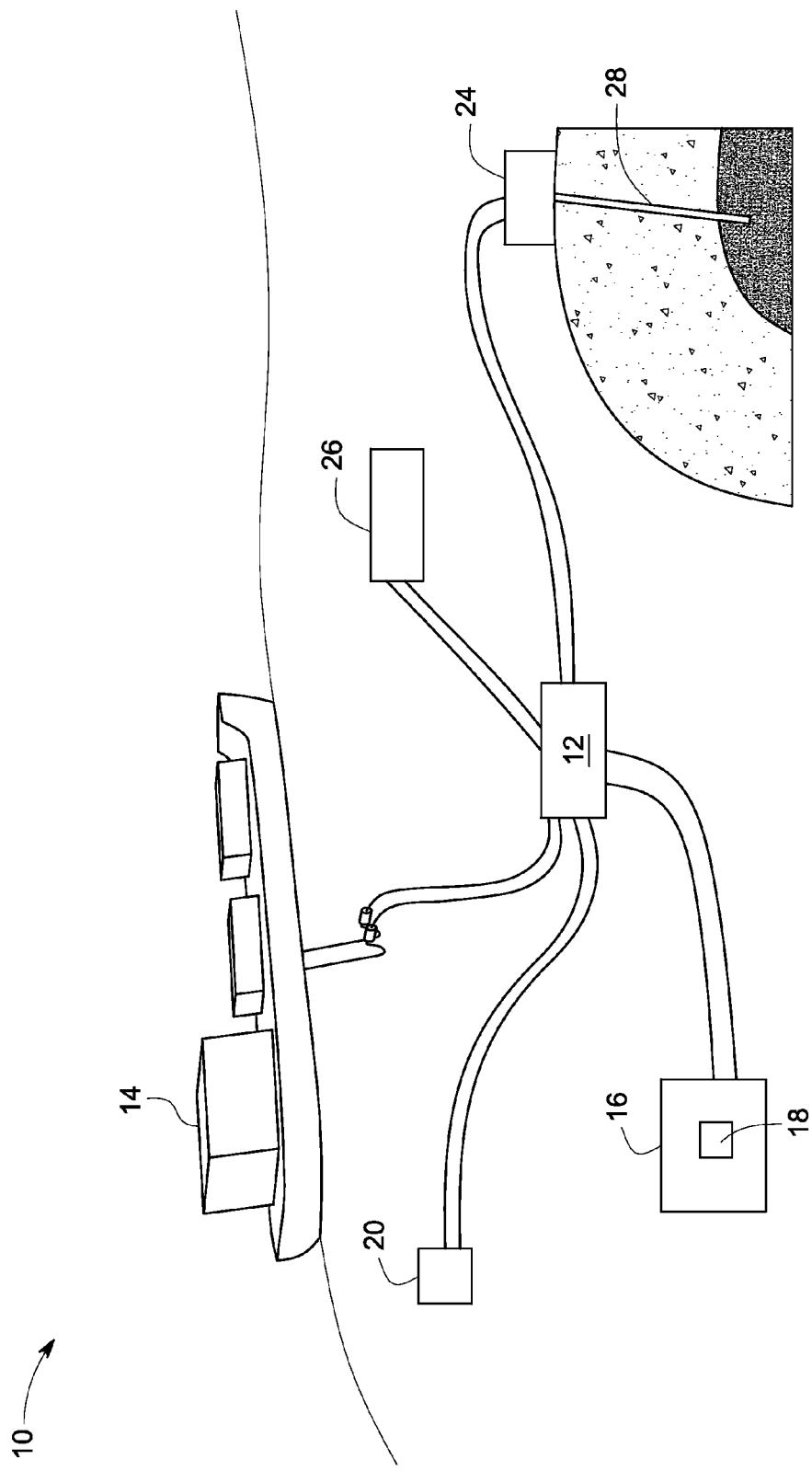
FIG. 1 illustrates a sub-sea drilling system according to an embodiment of the invention.

FIG. 1 illustrates a sub-sea drilling system according to an embodiment of the invention. The sub-sea drilling system 10 includes various systems and sub-systems interconnected underwater and to systems onshore. Sub-sea production systems may include multiple satellite wells with flow lines coupled to, for example, a sub-sea distribution unit 12 that is in turn coupled to a master control station 14 that is hosted for example on a floating drilling vessel or floating oil platform.

Wellhead systems 16, 24, 26 at the surface of each satellite well on the sea-bed provide the structural and pressure containing interface for the drilling and production equipment. Each wellhead system typically hosts a sub-sea control module/electronics module 18. Sub-sea distribution unit 12 is configured to control the flow lines between each satellite well and the master control station 14. Remote operator workstation 20 includes, in one embodiment, remotely operated vehicles to assist in the drilling and production.

Concentric components 28, such as well-bores, tubing hangers, and tree heads are disposed beneath each wellhead system 24. During production, oil and gas is transported from beneath the sea-bed via a well-bore at high pressure and temperature. The primary function of wellhead system is to control the flow of oil and/or gas into or out of the well. The wellhead system may further provides additional features such as ports for injecting chemicals, well intervention elements for wet and dry mate connections, pressure relief elements such as annulus vents, sensors for monitoring the tree and well for parameters such as pressure, temperature, corrosion, erosion, sand detection, flow rate, flow composition, valve and choke position feedback, and connection points for devices such as down hole pressure and temperature transducers.

Figure 2:
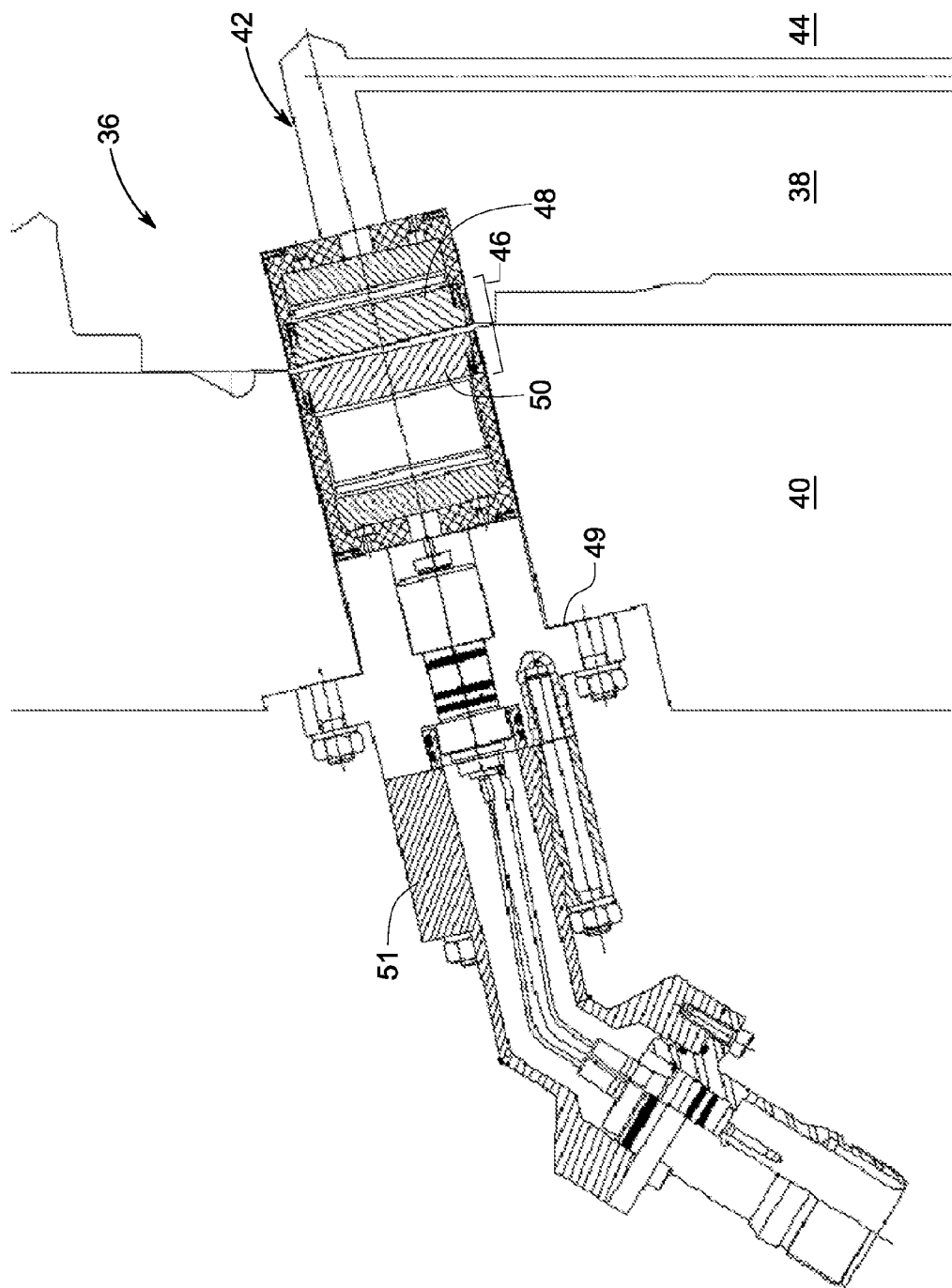
FIG. 2 illustrates a cross-sectional view of concentric components within a wellhead system.

FIG. 2 illustrates a cross-sectional view of concentric components within a wellhead system. The reference numeral 36 illustrates a portion of the first component 38 shown for purposes of example as comprising a tubing hanger that is concentrically disposed within a second component 40 shown for purposes of example as comprising a tree head. Also, for purposes of example, FIG. 2 depicts a portion of the tubing hanger 38 wherein electrical connections 42 are tapped from the well-bore 44 into the tree head 40. A power coupling system 46 comprises at least a first power coupling unit 48 disposed on the first component 38 and a second power coupling unit 50 disposed on the second component 40. As discussed earlier, the electrical connections coupled to the first power coupling unit may originate from devices such as down hole pressure and temperature transducers within the well-bore. A connection flange 49 is coupled to the tree head and configured to provide a dry mate connection 51 to facilitate electrical coupling with the control module/electronics modules on the wellhead.

Figure 3:
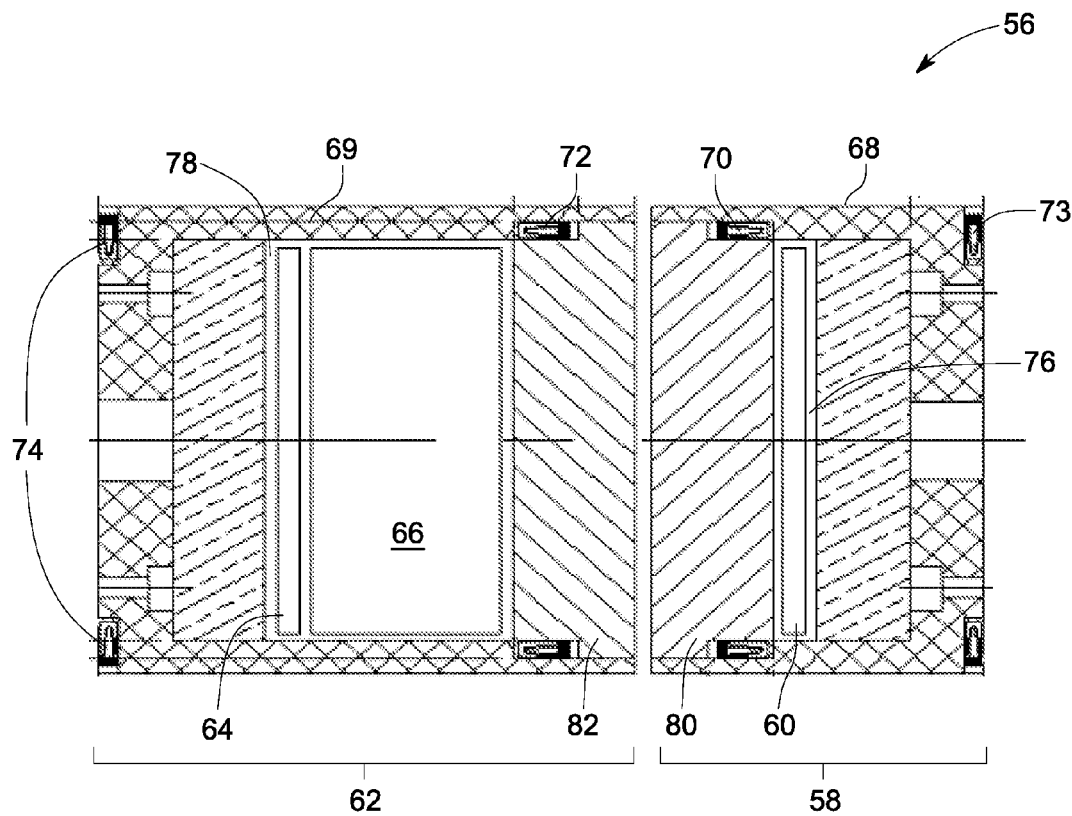
FIG. 3 illustrates a detailed view of power coupling according to an embodiment of the invention.

FIG. 3 illustrates a detailed view of a power coupling system according to an embodiment of the invention. The power coupling system 56 comprises a first power coupling unit 58 disposed on the first component (38 as referenced in FIG. 1) and includes cavity 76 configured to host at least one transceiver and resonator 60. A second power coupling unit 62 is disposed on the second component (40 as referenced in FIG. 1) and includes cavity 78 configured to host at least one transceiver 64 and resonator 66. A pressure casing 68 configured as a pressure isolation element in the embodiment of FIG. 3 includes seals 70, 73 and pressure isolation cap 80 to isolate high pressure within well-bore environment and the first power coupling unit 58. Similarly, seals 72 and 74 and pressure isolation cap 82 are disposed around pressure casing 69 to isolate high pressure within the well-bore environment and the second power coupling unit 62. Non-limiting examples of pressure isolation cap material include non-magnetic materials, insulating materials, and non-porous materials.

Transceivers 60 and 64 may be configured to transfer power in a contactless manner. The contactless power transfer may be bi-directional. In one embodiment, transceiver 60 receives signals from down hole devices in the well-bore and transfers those signals in a contactless manner onto the transceiver 64 via the resonator 66. Transceiver 64 is in turn coupled to the control module 14 (FIG. 1) via a dry mate connection. The first and second power coupling units are substantially aligned for most efficient contactless power transfer. However, in the presently contemplated embodiments, misalignments, such as up to several millimeters laterally and/or several degrees radially, are more tolerable than in conventional embodiments.

Figure 4:
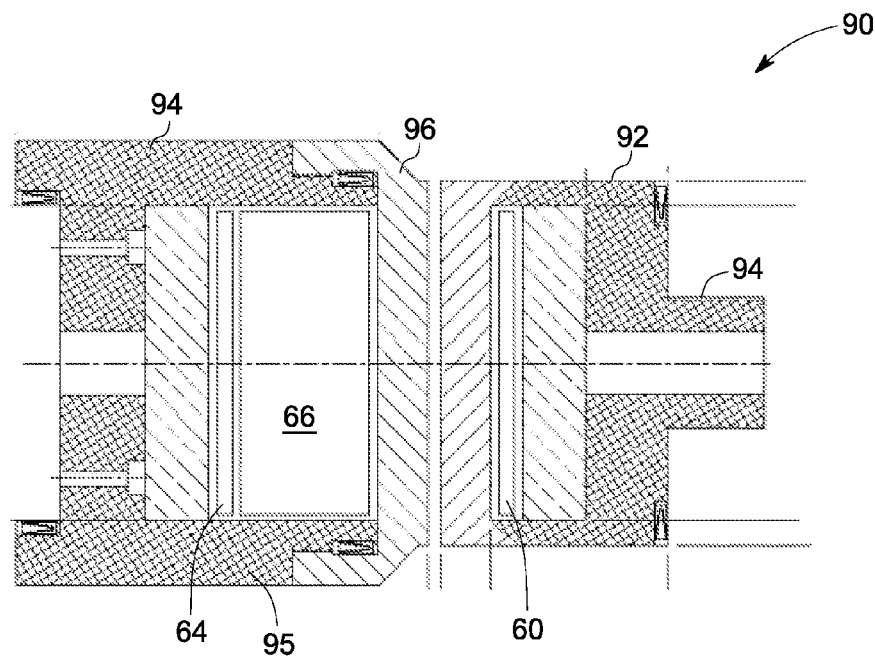
FIG. 4 illustrates an alternate arrangement of power coupling according to an embodiment of the invention.

FIG. 4 illustrates an alternate arrangement of power coupling according to an embodiment of the invention. In the illustrated embodiment, the pressure casing and pressure isolation cap have enhanced thickness as compared to the power coupling system in FIG. 3. It may be noted that such enhanced pressure isolation is useful for high pressure environments within the well-bore. The power coupling system 90 illustrates a first power coupling unit 92 having a projection 96 to host the electrical connections coupling the transceiver 60. The second power coupling unit 94 includes an enhanced pressure casing thickness 95 having pressure isolation cap 96.

Figure 5:
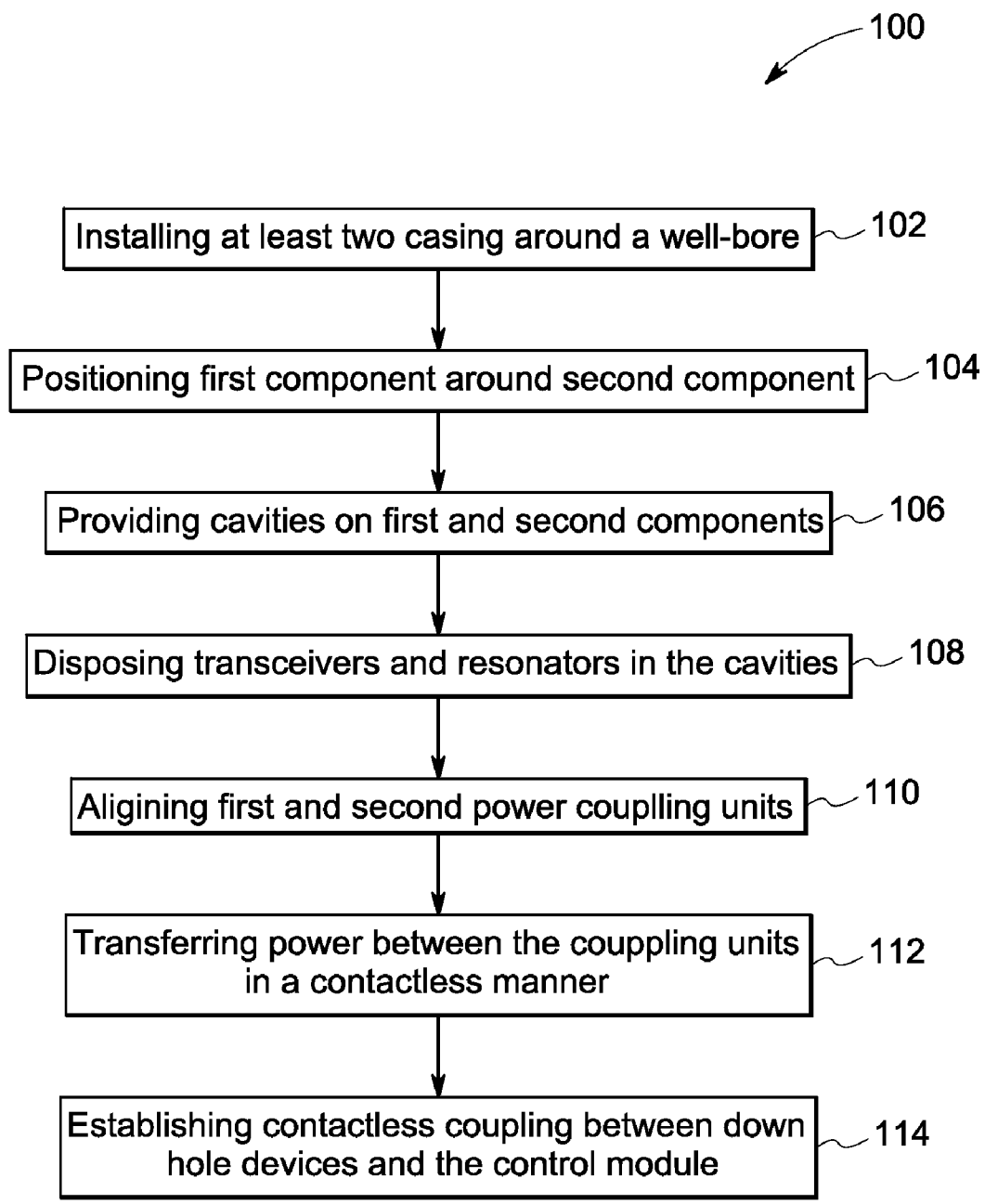
FIG. 5 illustrates an exemplary method of establishing a contactless power coupling between at least two concentric components in a wellhead system.

FIG. 5 illustrates an exemplary method of establishing a contactless power coupling between at least two concentric components in a wellhead system. The method 100 includes installing at least two components around well bore in step 102. First component is installed around a second component in step 104. For the purposes of example, first component may include a tubing hanger and second component may include a tree head. Cavities are provided on the first and second component in step 106. Transceivers and resonators are disposed within the cavities in step 108. First and second power coupling units comprising the transceivers and resonators are aligned with each other at step 110. Power is transferred between the first and second power coupling units in step 112. Contactless coupling is established between down hole devices and the control module in step 114.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An apparatus to provide electrical coupling between two components in a well system, the apparatus comprising:
    a first component disposed around a well-bore and configured to host electrical connections;
    a second component disposed concentrically above the first component and configured for power coupling with the first component;
    a first power coupling unit disposed on the first component and configured to host one or more transceivers and resonators;
    a second power coupling unit disposed on the second component and configured to host one or more transceivers and resonators, wherein the transceivers and resonators on the first and second power coupling units are configured to transfer power in a contactless manner.

2. The apparatus of claim 1 further comprising a pressure isolation element between the well-bore and the first power coupling unit.

3. The apparatus of claim 1 further comprising a pressure isolation element between the well-bore and the second power coupling unit.

4. The apparatus of claim 1, wherein the transceivers and resonators on the first and second power coupling units are configured to transfer power bi-directionally.

5. The apparatus of claim 1, wherein the first power coupling unit is aligned to the second power coupling unit.

6. The apparatus of claim 1, wherein the first and the second power coupling units comprise cavities to host the transceivers and the resonators.

7. The apparatus of claim 6, wherein the cavities are sealed via pressure isolation caps.

8. The apparatus of claim 7, wherein the pressure isolation comprises a non-magnetic material.

9. The apparatus of claim 1 further comprising a connection flange to couple the first power coupling unit with a dry mate connection.

10. The apparatus of claim 1, wherein the second power coupling unit is coupled to a plurality of sensors and electrical devices hosted within the first component.

11. A method for providing electrical coupling comprising:
    installing at least two components within a wellhead system, each component comprising a power coupling unit including a transceiver situated within a pressure isolation element;
    positioning a first component concentrically within a second component;
    aligning the power coupling unit of the first component with the power coupling unit of the second component to enable electrical power and signal communications automatically in both directions in a contactless manner between the transceivers of the power coupling units of the first and second components.

12. The method of claim 11 wherein the first component comprises a tubing hanger and the second component comprises a tree head.

13. The method of claim 11 further comprising disposing at least one resonator between the transceivers of the power coupling units of the first and second components.

* * * * *